Patented Jan. 27, 1931

1,790,220

UNITED STATES PATENT OFFICE

OTTO BALZ AND WILHELM WAGNER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CONVERSION OF CALCIUM COMPOUNDS

No Drawing. Application filed July 3, 1928, Serial No. 290,269, and in Germany July 11, 1927.

Gypsum, when obtained by double decomposition of sulfuric acid or sulphates and material containing calcium compounds often separates in a more or less mucilaginous form, which is unfavorable for its separation from the mother liquor and presents great difficulties in practice.

We have now found that the settling of the gypsum and its separation is much facilitated if the decomposition is carried out in the presence of metaphosphoric acid which expression is meant to comprise also its salts insofar as these are soluble in the reaction liquid. The gypsum is thus obtained granular and uniform in character, so that it settles out quickly and the filtration proceeds smoothly and rapidly.

When converting for instance potassium sulphate and calcium nitrate into potassium nitrate and calcium sulphate, or when decomposing phosphate rock with sulfuric acid or acid salts of sulfuric acid to obtain free phosphoric acid or acid salts of same, say for example acid potassium phosphate, small amounts of metaphosphoric acid are added to the reaction mixture, thus causing the gypsum to separate in an easily filterable form. The said addition further provides the essential advantage, that the extensive foaming occurring during the decomposition of many phosphates with sulfuric acid is considerably lessened.

The amount of the said compounds necessary to be added to effect granular crystallization of gypsum is small. Generally speaking, only a few per cent up to about 10 per cent of metaphosphoric acid calculated on the amount of calcium compound treated are sufficient for producing the desired result though even less than one per cent for instance about 0.3 per cent may be employed occasionally. The exact amount of metaphosphoric acid to be added varies with the different initial materials treated and can easily be determined by a few tests. Moreover it is not necessary to add a fresh amount of metaphosphoric acid to every new charge as at least part of the requisite amount can be supplied by reintroducing part of the mother liquor resulting from a previous treatment, freed from the calcium sulphate deposited, and containing a considerable amount of the said addition, for instance when decomposing phosphate rock. This reintroduced part of the mother liquor of a previous treatment serves also as a diluent for the sulfuric acid necessary for decomposing the fresh charge. Thus not only the added metaphosphoric acid is utilized to a large extent, but the said manner of working enables in a simple manner a phosphoric acid of a high concentration, viz. about 40° Bé. and more to be obtained, since sulfuric acid of much higher concentration can be employed for effecting decomposition, without running the risk of a nearly inseparable pasty mixture of gypsum with phosphoric and sulfuric acid being formed.

The following examples will further illustrate the nature of the said invention which however is not limited thereto.

*Example 1*

About 0.3 to 1 kilogram of metaphosphoric acid is introduced into 1 cubic meter of a 24° Bé. solution of calcium nitrate, about 320 kilograms of very finely ground 90 per cent potassium sulphate being then added to the hot solution. When the conversion is completed, the granular gypsum can be easily filtered off from the potassium nitrate solution.

*Example 2*

5 tons of Morocco phosphate are converted with a dilute sulfuric acid containing 3.2 tons of sulfur trioxid, in which about 30 to 60 kilograms of sodium metaphosphate are dissolved. After the reaction has proceeded for several hours, the deposited gypsum which is of a granular character, can be easily separated by filtration.

*Example 3*

10 tons of a 70 per cent pebble phosphate which in the ordinary way of decomposition with sulfuric acid yields a gypsum of thick pasty consistency settling only with difficulty, are treated with dilute sulfuric acid, containing about 6.3 tons of sulfur trioxid and 100 kilograms of calcium metaphosphate.

The gypsum obtained settles readily and can be easily filtered off from the phosphoric acid solutions.

*Example 4*

1 ton of Morocco phosphate is treated with an aqueous solution containing 25 kilograms of sulfuric acid, 680 kilograms of sodium bisulfate and 5 to 10 kilograms of free metaphosphoric acid. After the reaction has proceeded for several hours, the gypsum, which has settled down as a granular precipitate, can be easily filtered off from the solution of acid sodium phosphate. If pebble phosphate be employed instead of Morocco phosphate, an adidtion of only from 2 to 5 kilograms of metaphosphoric acid will be sufficient.

*Example 5*

1 ton of Morocco phosphate is introduced into 2 cubic meters of a mixture of a 23° Bé. phosphoric acid and sulfuric acid containing 620 kilograms of sulfur trioxid in which about 4 to 5 kilograms of metaphosphoric acid are dissolved. At the same time about 2 to 3 cubic meters of a 39° Bé. phosphoric acid are added. After the reaction has proceeded for several hours, the gypsum deposited in a granular form, can easily be separated by decantation or filtration from the concentrated phosphoric acid formed. Part of the phosphoric acid thus obtained, containing most of the metaphosphoric acid employed in the first conversion, is added to the following charge, instead of the above said 2 to 3 cubic meters of a 39° Bé. phosphoric acid. In this case therefore no or at least much less of fresh metaphosphoric acid is to be added to obtain the described effect, than to the first charge.

What we claim is:

1. In the decomposition of materials containing a calcium compound with a compound containing a sulfuric acid radical the step of adding small amounts of metaphosphoric acid.

2. In the decomposition of materials containing a calcium compound with a compound containing a sulfuric acid radical the step of adding between about 0.3 and 10 per cent calculated on the amount of calcium compound employed of metaphosphoric acid.

3. In the decomposition of phosphate rock with a compound containing a sulfuric acid radical the step of adding small amounts of metaphosphoric acid.

4. In the decomposition of phosphate rock with sulfuric acid the step of adding between about 0.3 and 10 per cent of metaphosphoric acid calculated on the amount of phosphate rock employed.

5. In the decomposition of phosphate rock with a sulfuric acid the step of reintroducing part of the mother liquor from a previous charge containing metaphosphoric acid into the process and adding such small amounts of metaphosphoric acid that the reaction mixture contains between about 0.3 and 10 per cent thereof calculated on the amount of calcium compounds present.

In testimony whereof we have hereunto set our hands.

OTTO BALZ.
WILHELM WAGNER.